Dec. 7, 1937.    A. C. WALDVOGEL    2,101,417
ROASTING APPARATUS
Filed April 18, 1934    4 Sheets-Sheet 2

Inventor
Albert C. Waldvogel
by Rippey & Kingsland
His Attorneys

Dec. 7, 1937.  A. C. WALDVOGEL  2,101,417
ROASTING APPARATUS
Filed April 18, 1934  4 Sheets-Sheet 3
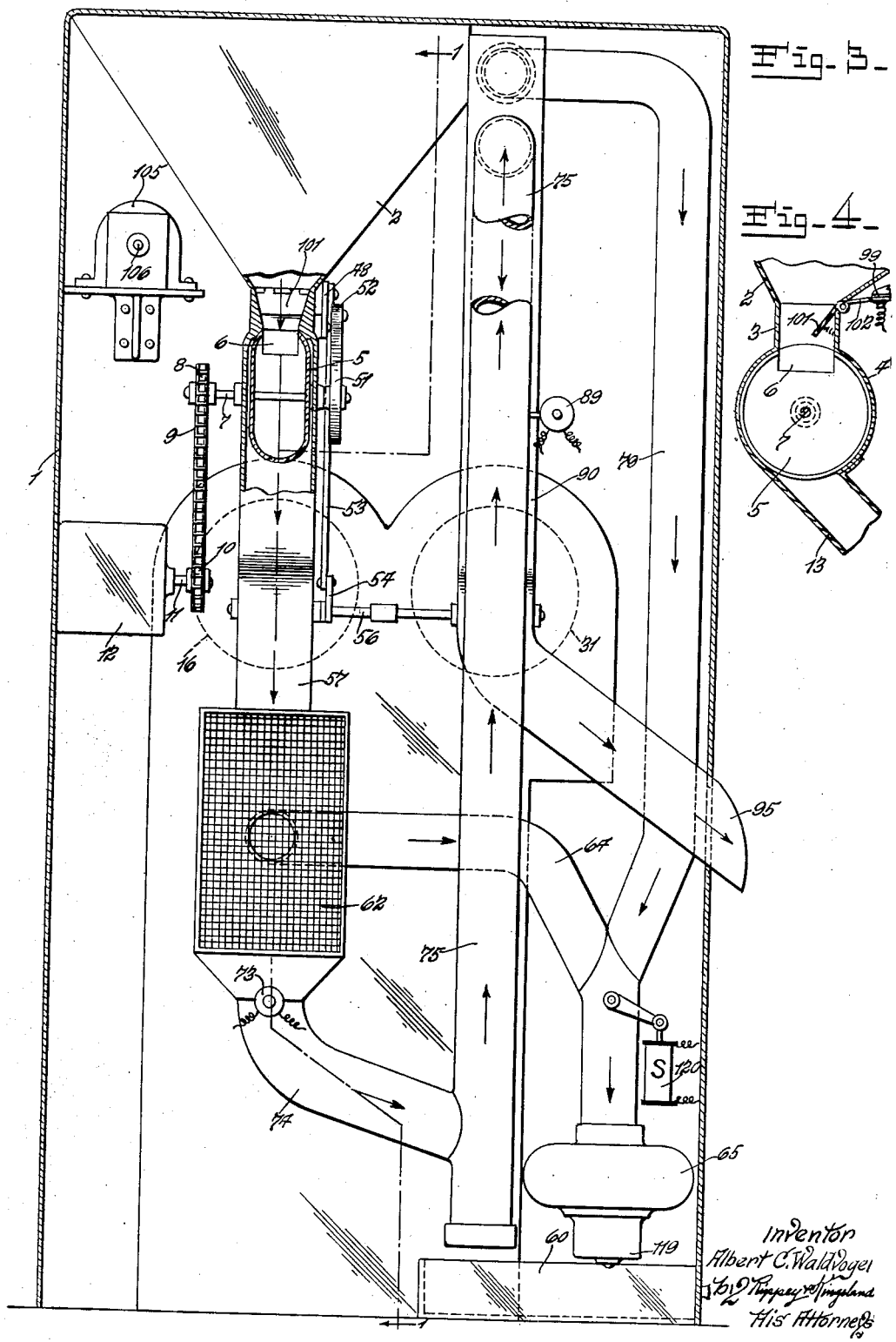

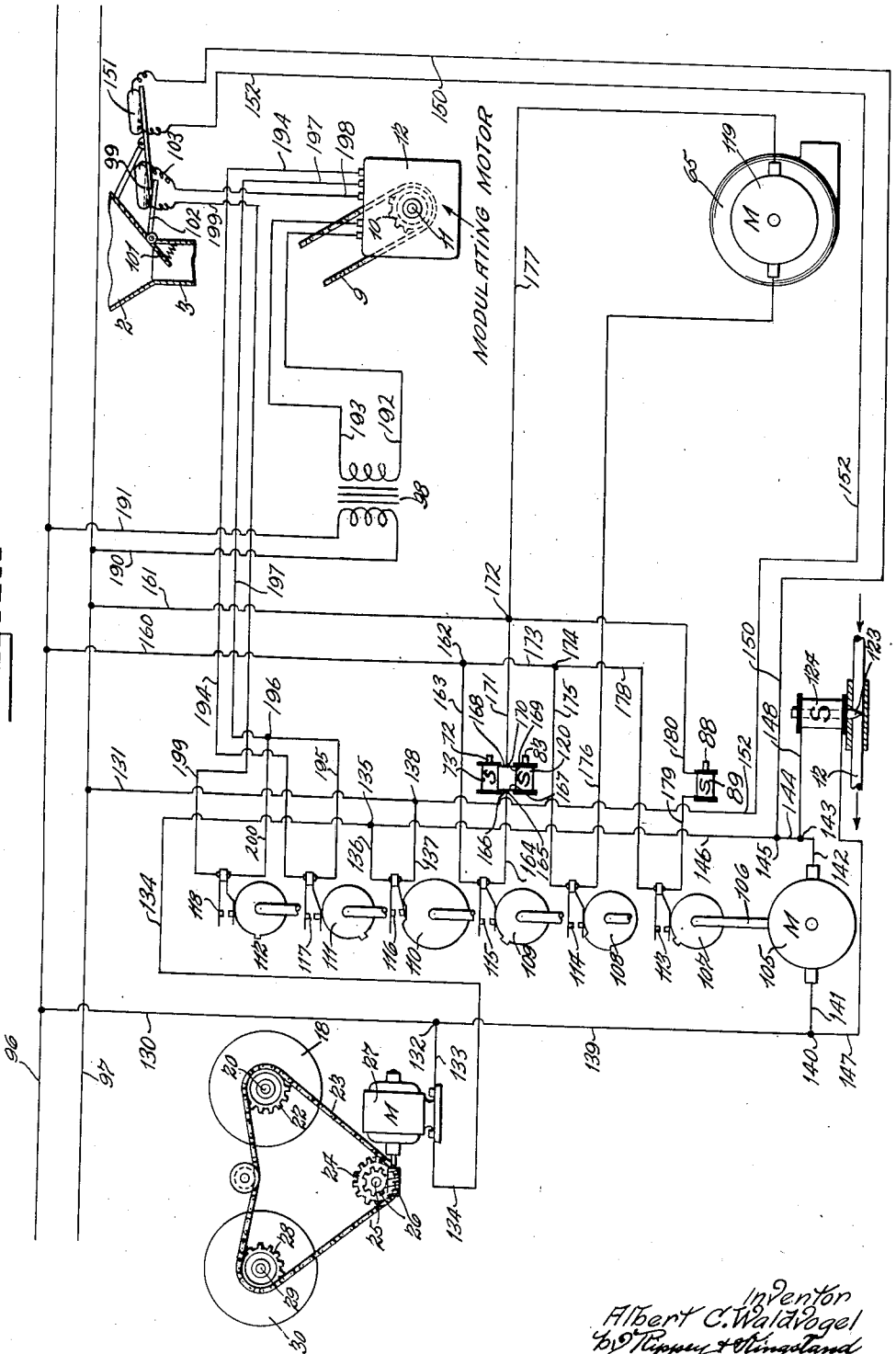

Patented Dec. 7, 1937

2,101,417

UNITED STATES PATENT OFFICE 2,101,417

ROASTING APPARATUS

Albert C. Waldvogel, Richmond Heights, Mo.

Application April 18, 1934, Serial No. 721,093

21 Claims. (Cl. 34—5)

This invention relates to roasting apparatus, and has special reference to roasting apparatus designed and adapted for use in roasting coffee and the like.

Objects of the invention are to provide an improved roasting apparatus for use in roasting coffee and the like, including a rotary measuring receiver arranged to receive and deliver measured supplies of coffee into a rotary roaster; to provide means for moving or rotating the roaster and for stirring, agitating and mixing the coffee therein in order to roast the coffee uniformly; to provide means for removing and discharging the roasted coffee from the roaster; to provide improved mechanism for removing impurities and other substances from the roasted coffee; to provide improved means for synchronizing and timing the operations of the different operative parts of the invention in order to obtain the intended results; and to obtain all of the advantages and improved operations herein disclosed, reference being made to the annexed drawings, in which—

Fig. 3 is an elevation of the mechanism, one wall of the casing being removed and parts being shown in section.

Fig. 4 is a cross sectional view of the casing enclosing the rotary measuring receiver, said receiver being shown in end elevation.

Fig. 5 is a view showing an appropriate electric circuit mechanism and devices controlled thereby for operating the different parts of the invention in synchronism and timed relationship.

Figure 1:
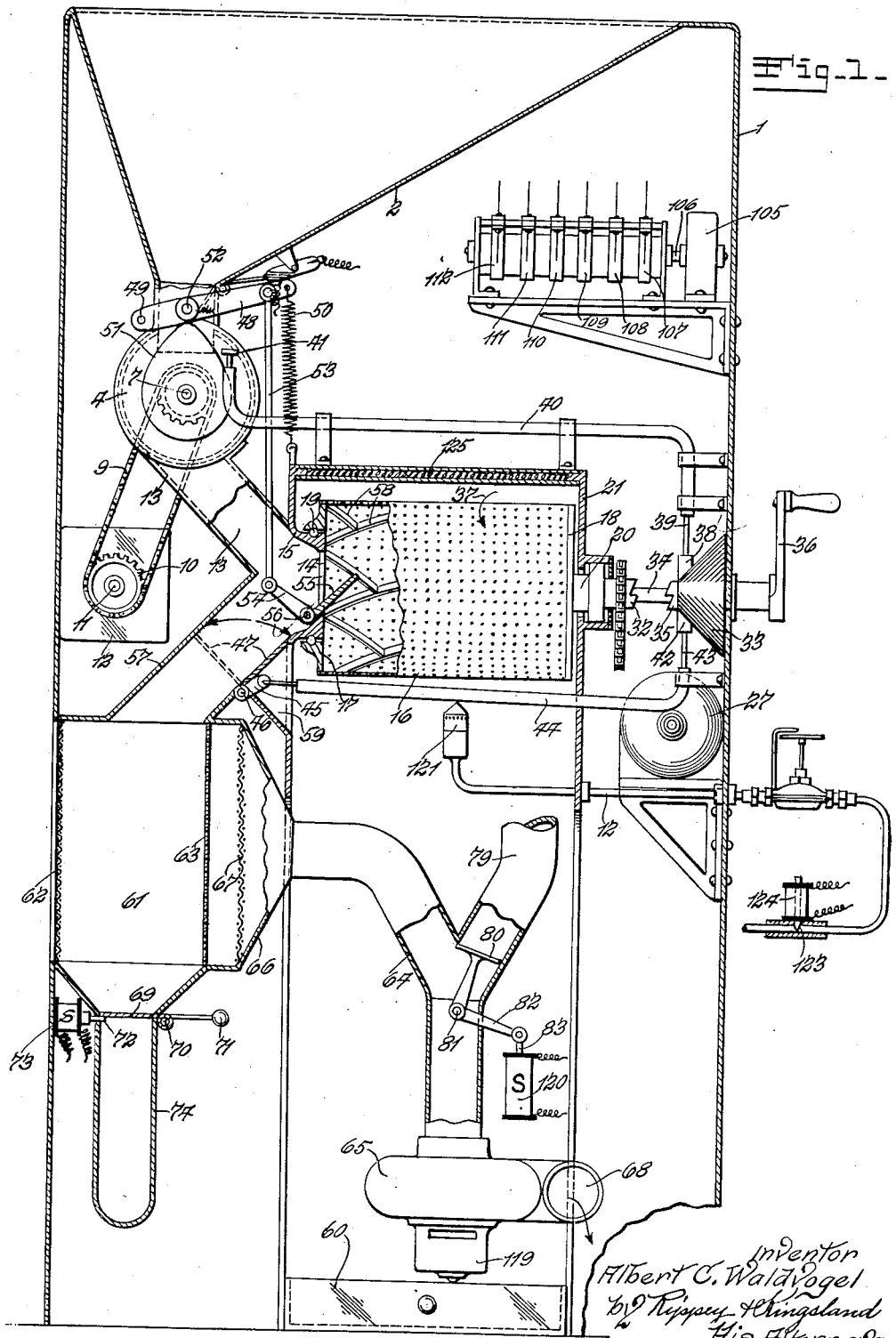
Fig. 1 is a vertical sectional view approximately on the irregular sectional line 1—1 of Fig. 3.

The principal parts of the invention are enclosed in a casing 1 having in the upper portion thereof a hopper 2 arranged to receive and contain a considerable amount of unroasted coffee. The hopper 2 has a chute 3 opening into a cylindrical casing 4 enclosing a hollow cylindrical measuring receiver 5. The cylindrical measuring receiver 5 has through one side thereof an opening 6 (Figs. 3 and 4) through which the coffee may pass into said measuring receiver when said opening 6 is in communication with the chute 3. The measuring receiver is attached to a rotary shaft 7 journalled in bearings in connection with the end walls of the casing 4. A sprocket wheel 8 is attached to one end of the shaft 7 and is engaged by a sprocket chain 9 that also engages a sprocket wheel 10 attached to the shaft 11 of a modulating motor 12. Therefore, when the motor 12 operates the measuring receiver 5 will be rotated from and to position in which the opening 6 is in communication with the chute 3.

The under side of the casing 4 opens into a chute 13 communicating with an opening 14 through a wall 15.

The opening 14 is into a rotary roasting chamber. Said roasting chamber comprises a perforated cylindrical wall 16, an end wall 17 and an opposite end wall 18. A bearing device 19 supports the end 17 of the rotary roasting chamber for rotation about the open end of the chute 13. A shaft 20 attached to the wall 18 is rotatively journalled in a bearing mounted on the support 21 and has a sprocket wheel 22 attached thereto. A sprocket chain 23 engages the sprocket wheel 22 and also engages a sprocket wheel 24 attached to a shaft 25 driven by gearing 26 operated by a motor 27. The sprocket chain 23 also engages a sprocket wheel 28 attached to a shaft 29 rigid with a rotary end wall 30 attached to a rotary cylinder 31.

A clutch member 32 (Fig. 1) is rigid with the shaft 20. A conical element 33 is mounted for sliding movements along a support 34 in axial alinement with the shaft 20 and has on its inner end a clutch member 35, adapted to be moved into and out of engagement with the clutch member 32, and on its outer end an operating crank 36. When the clutch member 35 is engaged with the clutch member 32 and then rotated by the crank 36, the roaster chamber 16 will be rotated in the direction of the arrow 37.

The conical member 33 is engaged by the terminal 38 of a flexible rod or shaft 39 mounted for sliding movements in a supporting tube 40 and having on its inner end a head 41. A block 42 also engages the cone 33 and is attached to the outer end of a flexible rod or shaft 43 mounted for longitudinal sliding movements in a supporting tube 44 and having its inner end pivoted to an arm 45 attached to the pivot 46 of a gate 47. When the conical member 33 is moved inwardly the rod or shaft 39 is moved inwardly to place the head 41 adjacent to the under side of a lever 48, which is mounted on a pivot 49 and actuated downwardly by a spring 50. When the head 41 is raised and held adjacent to the under side of the lever 48, said lever will be supported against operation by the spring 50.

A cam 51 is attached to the shaft 7 and is engaged by a roller 52 supported by the lever 48. The high point of the cam 51 is up during the time that the opening 6 into the measuring receiver 5 is in registration with the chute 3. When the shaft 7 is turned, the cam 51 is turned with the shaft and the spring 50 moves the lever 48 downwardly. When the head 41 is moved to its raised position, it will raise the lever 48 and support said lever in its raised position irrespective of the position of the cam 51; and, when the head 41 is in its raised position, it will prevent operation of the lever 48 even though the cam 51 operates.

A link 53 has its upper end connected with the lever 48 and its lower end connected with an arm 54 attached to a door 55 mounted on a rocking pivot rod 56. In the raised position of the lever 48, the door 55 extends through the opening 14 into the rotary roaster. When the lever 48 moves downwardly toward its lowest position, the link 53 and arm 54 swing the door 55 across the open upper end of a chute 57 opening from the lower side of the lower end of the chute 13. In such position, the door 55 forms the lower wall of the chute 13 across the open upper end of the chute 57 and will cause the coffee to pass from the chute 13 into the rotary roaster 16.

Series of curved or spiral flights or baffles 58 are attached to the inner side of the rotary roaster 16 and will discharge the roasted coffee continuously and regularly onto the inclined door 55 and thereby cause the roasted coffee to pass into the chute 57. It is to be understood that the door 55 is supported in such inclined position extending into the rotary roaster all the time that the lever 48 is supported in its raised position either by the cam 51 or the head 41.

When the clutch 35 and cone member 33 are moved inwardly to engage the clutch member 35 with the clutch member 32, the rod or shaft 43 swings the gate 47 from the position in which it is shown in solid lines in Fig. 1 to the position in which it is shown in broken lines extending across and closing the chute 57 below the door opening. When the gate 47 is moved to the dotted line position and closes the chute 57, the roasted coffee discharged from the heated roasting chamber 16 is caused to pass through a discharge opening 59 into a receptacle 60. The rods or shafts 39 and 43 may be actuated outwardly by any known or appropriate actuating means.

The coffee is discharged from the chute 57 into a cooling chamber 61, one wall of which is a screen 62 and the opposite wall 63 of which is perforated.

A pipe 64 has its lower end opening into a blower 65 and its upper end opening into a suction chamber 66 enclosing the wall 63 and also enclosing a screen 67. When the blower is operating, air is drawn through the cooling chamber 61 and discharged from the blower through an outlet 68.

A gate valve 69 closes the lower end of the cooling chamber and is mounted on a pivot rod 70. A counterweight 71 connected with the gate valve moves said gate valve to closed position in which it is held by a latch 72 to support the coffee in the cooling chamber. At the proper time, the latch 72 is withdrawn by an electro-magnet 73 to permit the coffee to open the gate valve 69 and pass through a chute 74 into the lower end of a tubular passage 75 extending upwardly and having its upper end opening into a hopper 76. A screen 77 is mounted in connection with the passage 75 below the opening from the chute 74. Such of the heavier foreign substances as will not be drawn through the passage 75 by suction may drop onto and through the screen 77 into a receptacle 78.

Upward suction through the passage 75 is created by the blower 65 through a passage 79 having its upper end opening into the hopper 76 into which the upper end of the passage 75 opens. The lower end of the passage 79 opens into the pipe 64. A gate valve 80 is attached to a rocking support 81 and is movable from position in which it closes the lower end of the passage 79 to position in which it closes the pipe 64 above the opening into the passage 79 and vice versa (Fig. 1). An arm 82 attached to the rod 81 is connected to a magnetic armature 83 and is operative to rock the rod 81 to move the gate valve to its different adjustments. Thus, when air is drawn through the pipe 64, the passage 79 is closed by the gate valve 80. When air is to be drawn through the passage 79 to create upward suction through the passage 75, the gate valve 80 is moved from the passage 79 to position to close the pipe 64.

A screen 84, mounted in the hopper 76 between the opening from the passage 75 and the opening into the passage 79, prevents the coffee from being drawn into said passage 79.

A gate valve 85, mounted on a pivot 86, closes the opening through the bottom of the hopper 76. This valve is moved to closed position by a counterweight 87 and is supported in closed position by a latch 88 released by an electro-magnet 89. When the latch 88 is released, the weight of the coffee in the hopper 76 will open the gate valve 85 and the coffee will pass through a chute 90 into the rotary cylinder 31. The cylinder 31 has an end wall 91 opposite the end wall 30 and is supported by a bearing device 92 on the open end of the chute 90.

The shaft 56, which supports the door 55 to control passage of the coffee from the chute 13 into the rotary roasting chamber 16 and to control discharge of the roasted coffee from the roasting chamber into the chute 57, also extends across the open lower end of the chute 90 and supports a door 93 in all respects like the door 55 and operated in like manner to discharge coffee into the cylinder 31 and to discharge coffee from said cylinder 31 into a chute 94 opening downwardly from the lower end of the chute 90 and having a discharge end 95 outside the casing 1.

Heat for heating the roasting chamber is generated by a burner 121 to which fuel is supplied through a pipe 122 controlled by a valve 123 operated by an electro-magnet 124 energized by the electric circuit, as shown in Fig. 5. It is immaterial from what source the heat is obtained and I do not restrict myself to the use of a device for utilizing combustible fuel for that purpose. Obviously, any known type of heater may be used, such, for instance, as an electric heating device.

Heat is confined around the chamber 16 and the rotary cylinder 31 by an insulated cover 125.

The previously described mechanisms are synchronized by mechanism now to be described. Although electrical mechanism is shown, it is understood that other similar mechanism could be used.

The power is derived from two power lines 96 and 97. Three main circuits, intercontrolled as will be shown, operate from these power lines.

The first main circuit includes lead 130 and return 131—designated thus, although alternating current preferably is used. Lead 130 divides at 132, into lead 133, through motor 27, thence through line 134, to point 135, line 136, switch 116, line 137, and into return 131 at point 138. It will be seen that switch 116 controls this circuit.

The other branch of lead 130, from point 132, is lead 139, branching at 140 into lead 141, the motor 105, line 142, to the point 143, line 144, to point 145, whence it passes into line 146 that joins line 134 at point 135 to pass through the switch 116 and to return 131. The motor 105 rotates the cam shaft 106 counterclockwise.

From point 140, the other branch of lead 139 is lead 147. This passes through the gas valve solenoid 124, and line 148 to point 143, where it joins line 144 to point 135 and through the switch 116 to return 131.

It will be seen that the motor 27, controlling the roasting and cleaning cylinders 16 and 31, the motor 105 controlling the switches, and the gas valve 124 are all in parallel, and are all controlled by the switch 116, which last is controlled by its cam 110. This cam is controlled in turn by the motor 105, so that further means must be provided for energizing these mechanisms when the cam switch 116 is open. To this end, a switch controlled by coffee in the hopper is provided, which switch is also subject to manual control.

This last mentioned switch is in parallel with the switch 116, and hence also controls each of the devices controlled by the switch 116. Its circuit is as follows: from point 145, that is on the line side of the motor 27, the motor 105 and the valve 124, extends a line 150. This line passes through a mercury switch 151, pivoted to the hopper 2 and controlled by the arm 102 connected to the plate 101 within the hopper. Hence the presence of coffee in the hopper depresses the plate 101, swinging the arm 102 upwardly, and closing the switch 151, as well as the switch 99. These switches may also be thrown manually.

From the mercury switch 151, the circuit includes line 152, that joins return 131 at point 138. By this circuit, whenever the switch 151 is closed, the three mechanisms are energized regardless of the position of the cam switch 116.

The second of the main circuits includes a lead 160 and a return 161. Lead 160 branches at 162 into lead 163 through cam switch 115, thence through lead 164, to point 165. At point 165, the lead branches so as to put the solenoids 73 and 120 of the valves 72 and 83 respectively, in circuit in parallel. To this end, from point 165 branch leads 166 and 167 to solenoids 73 and 120 respectively; and from said solenoids extend lines 168 and 169 respectively, that join at 170 into line 171, and at 172 the line 171 joins return 161.

Another circuit controlled from lead 160 is as follows: from point 162 branches lead 173. This in turn branches at 174 into lead 175, through cam switch 114, lead 176, the motor 65, line 177 and to return 161 at point 172.

A third circuit controlled from lead 160 is as follows: from lead 173, at point 174 branches lead 178. This passes through cam switch 113, lead 179, through the solenoid 89 of release 88, through line 180 to point 172 and return 161.

It will be seen that all of the foregoing circuits from lead 160 and return 161 are in parallel. Hence they are all independent, so that the cooler chamber release 73 and the Y valve 120 shift simultaneously under control of switch 115; the blower motor 65 operates under control of switch 114; and the cleaner hopper release 89 operates under control of switch 113. Since each of these switches is controlled by synchronizing motor 105, these several mechanisms are operated by said motor. They therefore are under control of the switches 116 and 151 that control the motor 105.

The third main circuit from the power lines 96 and 97 includes the leads 190 and 191. Lead 190 passes through the primary of the transformer 98, and thence to return 191. The transformer reduces the line voltage for operation of the modulating motor 12.

This motor 12 of itself forms no part of the invention. It is designed to operate first in one direction for 180°, and then in the opposite direction 180°, to actuate the measuring cup 5. However, it could operate in 180° intervals in a constant direction. For illustration, it may be considered as having internal switches that are automatically opened (as by cams) after a single 180° of operation. The motor includes two circuits, one for operating the cup from the up, or charge position, to the down, or discharge position, and the other for operating the cup from the down to the up position.

Both of these circuits are connected in parallel, to the secondary lead 192, and the secondary return line 193. In the first instance, as for operating the cup into the up position, the circuit goes from the secondary lead 192, through the internal switch, thence through line 194, the cam switch 117, line 195 to joint 196, thence through line 197 into the motor 12 and out the secondary return 193. This circuit obviously is controlled by the cam 111, and synchronizes the time of operation of the cup to turn up to be recharged.

The circuit for turning the cup down is as follows, it being understood that the motor 12, as soon as the cup reaches its charge, or up, position automatically cuts its internal circuits over for operation in the reverse direction; the secondary lead 192 goes through this other internal circuit of motor 12, out through line 198, through series mercury switch 99, through line 199, cam switch 118, and line 200 to point 196, whence it follows the common return 197 into the motor 12 and thence to secondary return line 193. It will thus be seen that the cup 5 will not turn from its charge to its discharge position unless both the switches, 99 and 118, are closed, so that the cup is under control of the synchronizing motor 105, and the coffee present in the hopper 2. It is to be remembered, however, that the switch 99 may be thrown manually.

The operation of the device is as follows:

At the stopping position all switches are open as shown in Fig. 5. Hence the entire mechanism is inoperative. To start the device, coffee is placed in the hopper 2. The weight of this coffee depresses the plate 101 closing both the switches 99 and 151. It will be understood that these switches may be thrown manually, if desired. Normally however, they are biased to open position. Closing of the switch 99 has no immediate effect, since the circuit of the motor 12 is open at switch 118. The closing of the switch 151 puts the motors 27 and 105 and the gas valve 124 into circuit despite the fact that at this time the switch 116 is open. Hence the gas valve 124 permits gas to flow to the burner, where it may be lighted. The motor 27 starts both of the cylinders 16 and 31 to rotating, and the motor 105 rotates the various cams in a counterclockwise direction. It may be assumed at this time that there is no coffee in any part of the mechanism. Very shortly after the motor 105 starts operation, the cam 110 will move to close the switch 116, thus closing the sustaining circuit to hold the motors 27 and 105 and the gas valve 124 in operation regardless of what may happen to the switch 151. This action does not take place immediately for reasons to be shown, but does take place in a very short while. It will be understood that these various circuits are closed from the lines 134, 144, and 146, through the line 136, the switch 116, the line 137 and into the return 131, at point 138.

At this time, the measuring cup 5 may be considered as rotated to position wherein its opening 6 is turned downwardly to the discharge position. From the drawings it will be evident that it will remain in this position throughout a substantial period of time. Since the cams rotate counterclockwise and the up cycle of the modulating motor 12 is controlled by the cam 111 and the switch 117, it may be seen that this period of time can be substantially over half of the time of a complete cycle, although, of course, the time can be varied. Hence when the machine is put in operation, it will remain empty of coffee until the roasting cylinder 16 has time to become suitably heated in the burner 121.

After this warming up period is passed, the second step in the cycle is for the cam 111 to close the switch 117. This energizes the motor 12 to turn the measuring cup 5 upwardly to its charge position, the circuit of the motor 12 being from secondary lead 192 through the now closed internal current of the motor 12 to line 194, through the switch 117, line 195, the common line 197 and the secondary return line 193. The motor 12 will then turn the cup upwardly. The motor 12 operates slowly so that the cam 111 must be of sufficient arcuate length to hold the switch 117 until the cup is all the way up.

Figure 2:
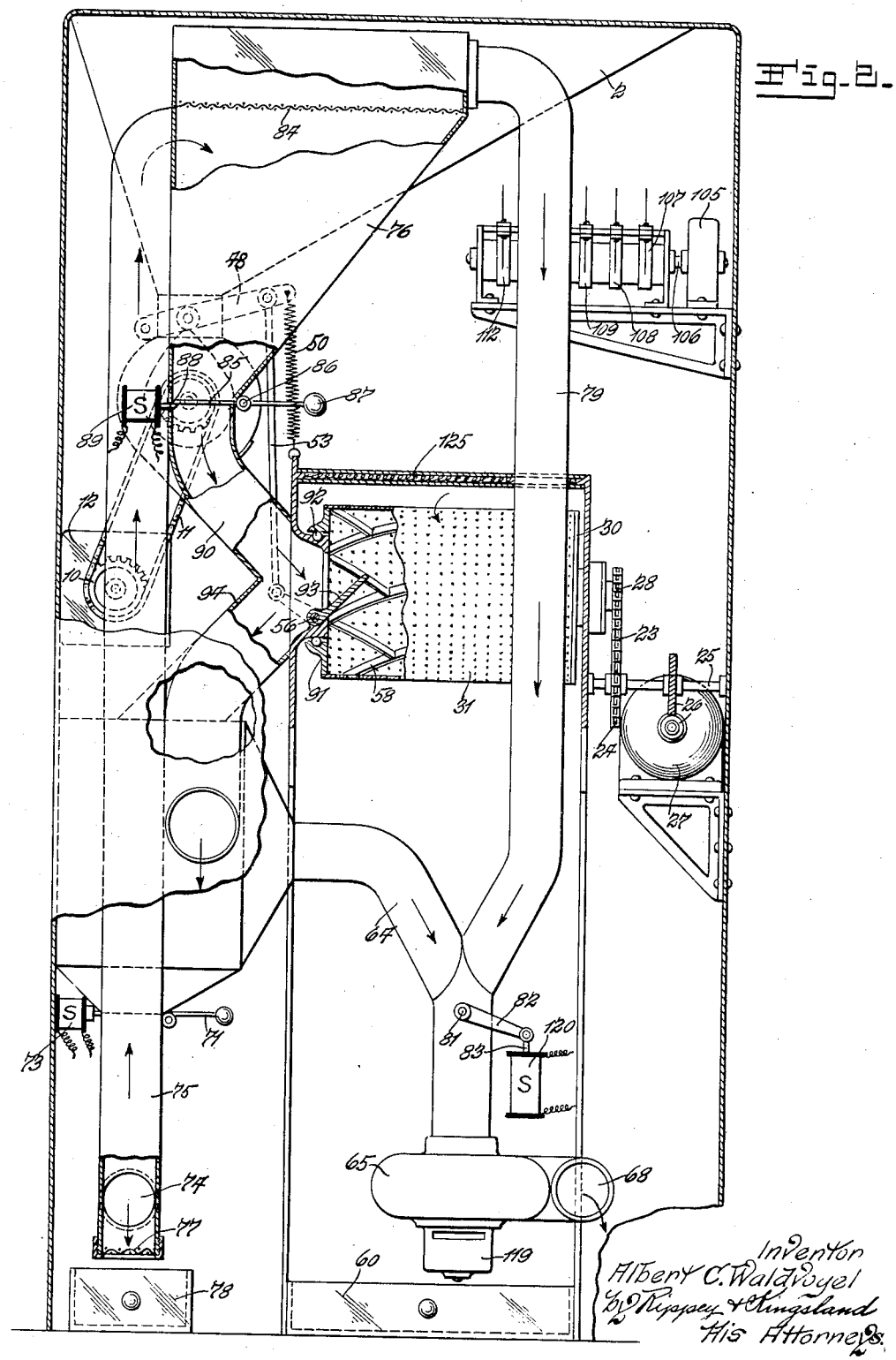
Fig. 2 is a similar irregular sectional view considerably to the right of the line along which the section of Fig. 1 is taken.

When the cup reaches its up position, the cam 51 will engage the follower 52 and through the linkage mechanism will shift the gates 55 and 93 to the position shown in Figs. 1 and 2 wherein they discharge coffee from their respective cylinders. This operation has no significance at this stage, since the cylinders are empty. As soon as the motor 12 has rotated the cup 5 to its up position, the motor automatically shuts off to its internal mechanism, which internal mechanism then operates to be ready to rotate the cup down.

With the cup in its upward position, coffee will then flow from the hopper 2 through the chute 3 into the cup until it fills the cup. This takes a certain length of time during which the cam 112 is moving over toward the position to close the switch 118. If the hopper contains enough coffee for a complete fill, the switch 99 will be maintained in closed position by the plate 101. Then when the cam 112 does close the switch 118, the motor will then turn the cup down. During this operation, the circuit to the motor 12 operates from the secondary lead 192 through the motor 12, the line 198, the switch 99, line 199, switch 118, the line 200, the common return 197 and through the motor 12 to the secondary line 193. The cup will then slowly rotate to its down position. As it does so, the cam 51 leaves its follower 52 so that the spring 50 through the link mechanism will shift the gates 55 and 93 out of their respective cylinders. The gate 55 now closes off the chute 57 and directs coffee discharged from the measuring cup into the chute 13 into the cylinder 16, which cylinder of course is constantly rotating.

As there is no coffee in the remainder of the system, the operation of the several cams 107, 108 and 109 is of no significance at the present time. The charge of coffee will remain in the cylinder 16 roasting until the cam 111 can throw the cup 5 upwardly. When this takes place, the gate 55 is turned to the position shown in Fig. 1 and coffee now roasting in the cylinder 16 is discharged into the chute 57 during all the time that the cup is up. The cup will remain up for the interval from shortly after the closing of switch 117 and shortly after the closing of switch 118 as determined by the cams 111 and 112. This time is sufficient to discharge all the coffee from the roasting cylinder 16 into the cooling chamber 61. Shortly, however, the cam 112 will again turn the cup down, shifting the gate 55 to its position outside the cylinder, and placing a new charge of coffee in the cylinder 16. At approximately the time the new charge is dropped into the cylinder 16, the cam 108 closes its switch 114, thus energizing the blower motor 65 off the lead 160 and the line 161. The Y valve 80 is now in position shown in Fig. 1 so that air is drawn by the blower through the cooling chamber 61 to cool the first charge of coffee now roasting therein. After a short period, the cam 109 will close the switch 115. This simultaneously energizes the solenoids 73 and 120 by placing them in circuit with the lead 160 and the line 161. Energization of solenoid 73 releases the bottom gate 69 so that the coffee within the chamber 61 will overbalance this gate and fall into the stoner compartment over the screen 77. Simultaneously the Y valve 80 shifts to suck air upwardly through the conduit 75 across the hopper 76 and downwardly through the conduit 79. This assists in drawing the coffee into the stoner compartment and subsequently lifts it—freed of stones, etc., into the hopper 76 where it rests against the gate 85. As soon as all the coffee is discharged from the air chamber 61, the counterweight 71 again closes the gate 69. After a short interval, of sufficient duration to permit all the coffee from the cooling chamber 61 to be lifted into the hopper 76, the switch 115 again opens, whereupon the release 72 again holds the gate 69 closed and the Y valve 80 returns to the position of Fig. 1. Shortly thereafter the blower motor is cut off by the action of the cam 108. The cam 107 then closes the switch 113 to release the gate 85 of the hopper 76 and coffee falls into the cleaning cylinder 31. It will be remembered that the cup 5, at this time, is in the down position so that the gate 93 is outside the cylinder 31 and directs coffee therein.

The coffee will remain in the cleaning cylinder until the gate 93 shifts to the position of Fig. 2. This will not take place until the cup 5 again shifts upwardly by the return of the cam 111 to the position to close the switch 117, thus recommencing the cycle for the third charge of coffee. When this occurs, the first charge is discharged from the cleaning cylinder 31 into the chute 94 and the discharge outlet 95. It will be understood that simultaneously now the second charge of coffee, now roasted, is discharged into the cooling chamber 61, following which a third charge is dumped from the cup into the roasting cylinder.

When it is desired to stop the mechanism, the mercury switch, including the bulbs 99 and 151, may be thrown manually. If, however at this time, there is a charge of coffee already in the roasting cylinder, the cam 110 will be in position to sustain the several circuits of the motor 27, the synchronizing motor 105 and the gas valve 124 until after the coffee has been discharged from the several cylinders. The discharge from the roasting cylinder is effected when the cam 109 closes the switch 115. The cam 110 will remain closed until after the coffee is drawn by the blower up into the hopper of the cleaning cylinder and also after the release from this hopper operates to discharge coffee into the chute 90. However, for reasons now to be shown, the coffee will not go into the cleaning cylinder.

When the mercury switch is open, the switch element 99 is also open. This prevents closure of the circuit for the down cycle of the modulating motor 12 by breaking connection between lines 198 and 199. Hence the cup 5 may not turn down sending an additional charge of coffee into the roasting cylinder, although the discharge of the former charge of coffee from the roasting cylinder goes on as previously described. In other words, the cam switch 117 will duly turn the cup 5 up where it will remain because the down circuit is now held open by the switch 99. With the measuring cup thus in its upward position, the cam 51 will hold the gates 55 and 93 inside their cylinders and in position to discharge their contents; and they will remain in this discharge position. Therefore the previously described charge from the cleaning cylinder hopper 79 cannot get into that cylinder but is directly discharged into the outlet 95 through the chutes 90 and 94. Shortly after the cam 107 closes the switch 113 and permits it again to open, the cam 110 opens the switch 116 to break the sustaining circuit and the entire machine stops. Thus it is seen that the machine cannot be stopped without completely roasting a charge of coffee. This point is significant since it prevents partially roasting the coffee at one operation and then completing it at another which would tend to produce ununiform roasting.

During the operation of the device, should at any time there not be enough coffee in the hopper 2 to completely fill the measuring cup 5, the plate 101 will shift upwardly again to open the switches 99 and 151. This will prevent the measuring cup from discharging a partial load into the roasting cylinder, such partial loads having a tendency to burn. However, at this time, the sustaining switch 116 will have been closed by the cam 110 to complete the cycle for previous charges, with the exception of the cleaning cylinder operation.

In beginning the discussion of this description, it was assumed that the device was going through a series of continuous operations. Therefore it was assumed that the cup was in the down position. As a matter of fact, after the machine is stopped in the manner heretofore described, either by manual operation of the mercury switch to the open position or by their automatic operation by failure of supply of coffee in the hopper 2, the measuring cup will have been held in the up position since the down circuit was open. This is the position when the machine is started anew. Hence when the cycle is initiated, the entire machine is empty and loading of coffee into the hopper 2 closes the mercury switches and immediately fills the measuring cup. When the cam 111 then subsequently closes the switch 117, which normally operates the motor 12 to turn the cup up, the motor will not operate since, as heretofore described, the internal circuits of the motor open as soon as 180° rotation is effected. Therefore this difference of having the cup up does not change the cycle from that of continuous operation. However, it will be noticed that the start of the machine finds the cam 112 in such position that the switch 118 that closes the down circuit to charge coffee into the cylinder will not be closed for some time. Therefore the machine will operate empty for a period during which the roasting chamber can become properly heated.

Should the machine be stopped, as by interruption of the power, the coffee may be discharged from the roasting chamber 16 by manually rotating said chamber by means of the clutch 35 and crank 36, at the same time preventing discharge of additional coffee into the roasting chamber by raising and supporting the head under the lever 48. The coffee manually discharged from the roasting chamber will be passed through the opening 59 into the receptacle 60.

It is now apparent that this invention obtains all of its intended objects and purposes efficiently and is a complete self-contained coffee roaster and cleaner and is automatic in its operations. The mechanism for synchronizing and timing the operation of the devices is an important feature of the invention, and the disclosure should be sufficient to enable anyone skilled in the art to make and operate the device.

I do not restrict myself unessentially in any particulars but contemplate such variations as are within the scope of the appended claims.

I claim:

1. A roasting apparatus comprising a rotary measuring receiver, a rotary roasting chamber, a chute for conducting coffee and the like from said receiver into said roasting chamber, a chute for conducting coffee and the like from said roasting chamber, a single means controlling delivery of coffee and the like from said first chute into said roasting chamber and from said roasting chamber into said second chute, mechanism for rotating said chamber, and devices operated by said mechanism for operating said controlling means to a position to deliver coffee into said roasting chamber only when said receiver is in its discharge position.

2. A roasting apparatus comprising a rotary measuring receiver, a rotary roasting chamber, a chute for conducting coffee and the like from said receiver into said roasting chamber, a chute for conducting coffee and the like from said roasting chamber, a gate movable to extend into or out of said rotary chamber and in its several positions controlling delivery of coffee and the like from said first chute into said roasting chamber and from said roasting chamber into said second chute, mechanism for rotating said receiver, and mechanism operated by said mechanism and in synchronism with said rotary measuring receiver controlling the operation of said means whereby to effect passage of coffee and the like from said first chute into said roasting chamber and from said roasting chamber into said second chute.

3. A coffee roasting apparatus comprising a rotary roasting chamber, a rotary stoner, a first mechanism for rotating said chamber and said stoner in synchronism, a second mechanism movable into different positions, one for directing quantities of coffee into said roasting chamber and one for discharging the coffee therefrom below the entrance to said stoner, suction mechanism for subsequently conveying the coffee to a position above said stoner, means for directing the coffee into said stoner, and for directing the coffee from said stoner, said last named means being connected with said second mechanism to operate simultaneously therewith.

4. In a coffee roasting apparatus, a rotary roasting chamber, diverging and communicating chutes for conducting coffee into said chamber and from said chamber respectively, a device controlling passage of coffee from one of said chutes into said chamber and from said chamber into the other chute, mechanism for rotating said chamber and for operating said device in a timed relationship to control passage of coffee discharged from one of said chutes into said chamber and to discharge coffee from said chamber into said second chute when said first chute is empty, a cooling chamber arranged to receive coffee from said second chute, and a device controlling said second chute for discharging coffee therefrom into said cooling chamber or not as desired.

5. In a device of the kind described, a processing chamber, a discharge outlet therefrom, a second processing chamber having an entrance above said discharge outlet, a receiving chamber above said entrance, and air flow means connecting said discharge outlet with said receiving chamber including a blower, a flow conduit from said second chamber to said receiving chamber for transmitting the material discharged, and a return conduit leading back from the receiving chamber to the blower, cut-off means to prevent flow through the flow conduit, and means for synchronously controlling the operation of said blower and said cut-off means, so that the blower is inoperative during at least part of the time the cut-off means is closed.

6. In a device of the kind described, a measuring device, a processing mechanism, a conduit between the two, said measuring device being rotatable to a position to discharge into said conduit, a gate in said conduit and blocking passage from the measuring device to the processing mechanism, motive means including a rotary member for operating said measuring device, a cam on said rotary member, and means actuated by said cam to operate said gate in synchronism with the operation of the measuring device, so that the gate does not block the passage when the measuring device is in discharge position.

7. In a device of the kind described, a measuring device, a processing mechanism, a conduit between the two, said measuring device being movable to a position wherein it discharges into the conduit, and to another position where it does not, discharge means leading from said processing mechanism, a gate in said conduit, and means operating said gate into one position wherein it directs flow from the measuring device into the processing mechanism and simultaneously closes off said discharge means therefrom, and to another position wherein it directs flow from said mechanism into said discharge means, and means interconnecting said gate and said measuring device so that the gate is moved into position directing flow into the processing mechanism when the measuring device is in discharge position.

8. In a coffee roaster, a cooling chamber, a stoner, mechanism for rotating said stoner about a horizontal axis, conduit means for conveying said coffee from said cooling chamber to said stoner wherein it is cleaned, a receptacle in said conveying means to receive foreign objects deposited therein and thereby separated from said coffee, and means for discharging said coffee from said stoner.

9. In a device of the kind described, a roasting chamber, a stoner, each having an entrance opening, a gate controlling each of said openings, a single shaft upon which both gates are mounted, and mechanism for operating said shaft to move both gates simultaneously.

10. In a device of the kind described, a roasting chamber, a stoner chamber, ingress and egress passages for each, and a valve for each, each valve being designed to prevent egress and simultaneously provide ingress into its respective chamber, or to direct egress therefrom and simultaneously prevent ingress, and said valves being mechanically interconnected, whereby both are simultaneously in egress, or ingress positions relative to their respective chambers.

11. In a device of the kind described, a measuring device, motive means operating the same, a roasting chamber and a stoner chamber, a driving mechanism for rotating said stoner chamber simultaneously with said roasting chamber, a gate valve for each chamber, and means controlled by said motive means for operating said two gate valves simultaneously whereby both valves simultaneously admit a charge into their respective chambers.

12. In a device of the kind described, a movable roasting chamber, electric means for moving the same, a blower, electrical control means for it, a conduit communicating with said roasting chamber, electrically controlled cut-off means in said conduit, and a synchronizer having a plurality of switches with means for intermittently operating the same, for controlling said roasting chamber moving means, said blower and said cut-off means.

13. In a device of the kind described, a rotary roasting chamber, a rotary measuring chamber, a conduit between said two chambers, a cut-off in said conduit, means including electrical devices for operating each of said rotary devices, and for controlling said cut-off, switches controlling said electrical devices, and a synchronizer for selectively closing said switches so that said measuring chamber intermittently feeds into said conduit, said cut-off at the same time permits communication into said roasting chamber, and said roasting chamber rotates.

14. In a device of the kind described, a measuring device movable from receiving to discharging position, a movable roasting chamber, a motor for moving said measuring device, a circuit for said motor, a second motor for moving said roasting chamber, a circuit for said second motor, and synchronizing means controlled by said second motor when said second motor is operating and controlling the operation of said first motor.

15. In a device of the kind described, a measuring device, movable from receiving to discharging position, a movable roasting chamber, a motor for moving said measuring device, a circuit for said motor, a second motor for said roasting chamber, and a synchronizer including a third motor, said second and third motors being connected in parallel whereby to operate simultaneously, and said synchronizing devices including switches adapted to control all said motors.

16. In a roasting device, a roasting means operable to roast material for a predetermined period, a synchronizing device automatically operable for a given cycle, a blower device selectively operable to cool the roasted material or to convey it, said synchronizing device in its cycle first operating said roasting means, then energizing said blower device to cool the material, then operating the blower device to convey the material to a predetermined place, and after the material is conveyed, cutting off the blower device.

17. In a roasting device, a roasting means operable for a predetermined time, means including an electric circuit for operating said roasting means, two switches in parallel in said circuit, whereby the circuit is broken only if both switches are open, and means for maintaining one of said switches closed until the roasting operation is complete, once said operation has been started.

18. In a roasting mechanism, a rotatable roasting chamber, a motor for rotating the same, a switch, a motor for actuating the switch, said motors being connected in parallel, and the switch being in the circuit of both motors, said switch actuating motor having means to maintain the switch closed always until the roasting chamber has rotated for a predetermined time, and then to open the switch to permit both motors to stop.

19. In a roasting apparatus, a roasting chamber, a motor for moving the same, a synchronizing device, a motor for operating the device, and a gas valve with electrical means for controlling the same, said motors and said electrical means being connected in parallel, said synchronizing device including a switch in a junction of all said parallel circuits, and said switch being maintained closed by said synchronizing device after the roasting process is initiated, until after a predetermined period of time, whereby to keep the roasting chamber motor, the synchronizing motor and the gas valve operating means all energized during said period.

20. In a roasting apparatus, a roasting chamber, a measuring device movable to position to receive material, and then to position to discharge the same into the roasting chamber, a door controlling the passage of material into or out of said chamber, means operated by operation of said measuring device to move said door to position to discharge material from the chamber when the measuring device is in receiving position, a cooling chamber adapted to receive material discharged from said roasting chamber, a cooling mechanism operable to cool the material in said chamber, and synchronizing means to begin the operation of said cooling mechanism when the material enters said cooling chamber.

21. In a device of the kind described, a pair of cylinders, a gate for each cylinder, each gate being movable to one position wherein it directs material into the cylinder, and to another position wherein it directs material out of the cylinder, a common means for simultaneously moving said gates into corresponding positions with respect to their respective cylinders, a measuring device movable to charge material at intervals into the first of said cylinders, means operable by movement of said measuring device to shift said gates so that when said measuring device is in its charge position, the gates are in position to direct material into the cylinders, means for periodically operating said measuring device, means for conveying material from said first cylinder to be discharged into said second cylinder, and means for synchronizing the operations of the measuring device and conveying means so that the measuring cylinder is in its position to place the gates in position to direct material into the cylinders when the coffee has been made available by said conveying means for said second cylinder.

ALBERT C. WALDVOGEL.